(12) United States Patent
Swamidass

(10) Patent No.: US 8,733,093 B2
(45) Date of Patent: May 27, 2014

(54) HIGH-EFFICIENCY WIND POWER GENERATORS USED AS HYDROKINETIC ENERGY CONVERTERS ON BRIDGE AND OTHER STRUCTURES

(71) Applicant: Paul M Swamidass, Auburn, AL (US)

(72) Inventor: Paul M Swamidass, Auburn, AL (US)

( * ) Notice: Subject to any disclaimer, the term of this patent is extended or adjusted under 35 U.S.C. 154(b) by 0 days.

(21) Appl. No.: 13/964,038

(22) Filed: Aug. 10, 2013

(65) Prior Publication Data

US 2013/0333372 A1 Dec. 19, 2013

Related U.S. Application Data

(63) Continuation-in-part of application No. 13/429,375, filed on Mar. 24, 2012, now Pat. No. 8,459,020.

(51) Int. Cl.
*F03B 13/18* (2006.01)
*F03B 13/10* (2006.01)
*F03B 13/12* (2006.01)
*H02P 9/04* (2006.01)

(52) U.S. Cl.
USPC .................... 60/502; 60/507; 290/42; 290/53

(58) Field of Classification Search
USPC ................................ 60/495–507; 290/42, 53
See application file for complete search history.

(56) References Cited

U.S. PATENT DOCUMENTS

| | | | | | |
|---|---|---|---|---|---|
| 833,361 | A | * | 10/1906 | Wilmore | 290/4 D |
| 1,109,839 | A | * | 9/1914 | Henry | 415/7 |
| 3,604,942 | A | * | 9/1971 | Nelson | 290/54 |
| 4,392,060 | A | * | 7/1983 | Ivy | 290/53 |
| 6,006,518 | A | * | 12/1999 | Geary | 60/398 |
| 6,534,881 | B1 | * | 3/2003 | Slavchev | 290/54 |

* cited by examiner

*Primary Examiner* — Christopher Jetton

(57) ABSTRACT

In this invention, high-efficiency wind power generators are mounted on floats that are attached to bridge and other structures for generating electricity from hydrokinetic energy in water waves, currents and tides without submerging the wind power generators in the water. The use of bridge and other dual-use structures substantially reduces the capital cost necessary for installing this system to generate electricity in small as well as large amounts. Today, the systems for converting wind energy to electricity are far more advanced and efficient than existing systems for converting hydrokinetic energy. This invention could produce energy for water-transport vessels as well as for electric utilities.

4 Claims, 4 Drawing Sheets

HIGH-EFFICIENCY WIND POWER GENERATORS USED AS HYDROKINETIC ENERGY CONVERTERS ON BRIDGE AND OTHER STRUCTURES

CROSS-REFERENCE TO RELATED APPLICATIONS AND CLAIMS TO PRIORITY

This is a continuation-in-part of, and claims priority commonly assigned to U.S. patent application Ser. No. 13/429,375 filed on Mar. 24, 2012, now U.S. Pat. No. 8,459,020, issued Jun. 11, 2013, and application PCT/US2013/031334 filed on Mar. 14, 2013 filed through the USPTO, the receiving office. The entire disclosure of which is incorporated herein by reference.

BACKGROUND OF THE INVENTION

1. Field of Invention

The invention generally relates to the green, renewable energy industry and particularly to the hydrokinetic energy conversion (HKEC) industry by the novel combination of wind power generators on the one hand, and bridge and other supporting structures in all bodies of water. The invention substantially cuts the cost of HKEC systems because it may be retrofitted to existing bridge columns as well as to new bridge columns that support highway decks; the cost of the bridge structure may be fully absorbed by the project cost for constructing the bridge. Consequently, the cost of this invention for generating electric energy from the HKEC system becomes substantially lower than what it would be without using the bridge structure; this invention will turn bridge columns into dual-use structures.

Wind power generators (WPG) have evolved over the last couple of decades into highly efficient power generating systems to the extent that they are used by the world-wide utility industry in their wind farms for efficient bulk energy production. It is well known that the technology for harvesting Hydrokinetic energy (HKE) lags the wind power generator technology. Wind power generators operate at high efficiencies but cannot be submerged in water, but they can handle rain and heavy weather. This invention uses a novel method to keep WPGs above the water while generating electricity from HKE in any body of water.

2. Prior Art

Water in ocean, sea and rivers offer plenty of energy but the technology to harvest HKE energy from water is still in the experimental stages. Two of the problems facing HKEC systems are the cost and low efficiency of current systems.

U.S. patent application Ser. No. 13/429,375 filed on Mar. 24, 2012, and now issued U.S. Pat. No. 8,459,020, and the PCT application PCT/US2013/031334 teach the following about existing technologies for HKEC systems: they require expensive investment in civil and mechanical systems to retain these systems in boisterous water during severe weather. Further, this invention overcomes the well-known inefficiencies and experimental nature of the submerged wave and water-energy conversion technologies in existence today because this invention enables the use of wind power technology without submerging the equipment in the water.

BRIEF SUMMARY OF THE INVENTION

This invention includes the following embodiments but are not limited to them. The inventions listed below are to be of the appropriate scale to prevent overloading of the bridge columns beyond their designed strength. The embodiments below can be mounted on bridge-supporting columns already in use (retrofitted) or designed in the future as part of new bridge structures over water.

Further, this invention adapts highly efficient wind power generators for energy production by appropriate mounting on bridge columns, marine structures such as off-shore drilling platforms, seawalls, and vessels for transport by water including boats, tugboats, ships, fishing boats, lifeboats, etc.

EMBODIMENT 1

A Plurality of Wind Power Generators Mounted on the Side of Bridge Columns

This embodiment of the invention employs multiple units of adapted wind power generators mounted above the water line on a vertically slideable float attached to a bridge column or any structure in moving waters. HKE turns the float-turbine, which—turns an electric generator at a much higher RPM through a gearbox or gearing system. The power, so produced, may be used locally, stored in batteries for later use, or fed to the grid.

EMBODIMENT 2

A Plurality of Wind Power Generators Mounted on Non-Bridge Structures

This is an extension of Embodiment 1 to non-bridge structures. This invention is very versatile and can be used for electric energy generation in variety of structures in water including offshore oil/gas drilling platforms, seawalls, transportation vessels on water, piers, etc.

BRIEF DESCRIPTION OF THE SEVERAL VIEWS OF THE DRAWINGS

Embodiment 1

To explain the invention, a specific embodiment 1 is described with reference to FIGS. 1 through 2.

Embodiment 2

Embodiment 2 is described with reference to FIGS. 3 and 4.

Figure 3:
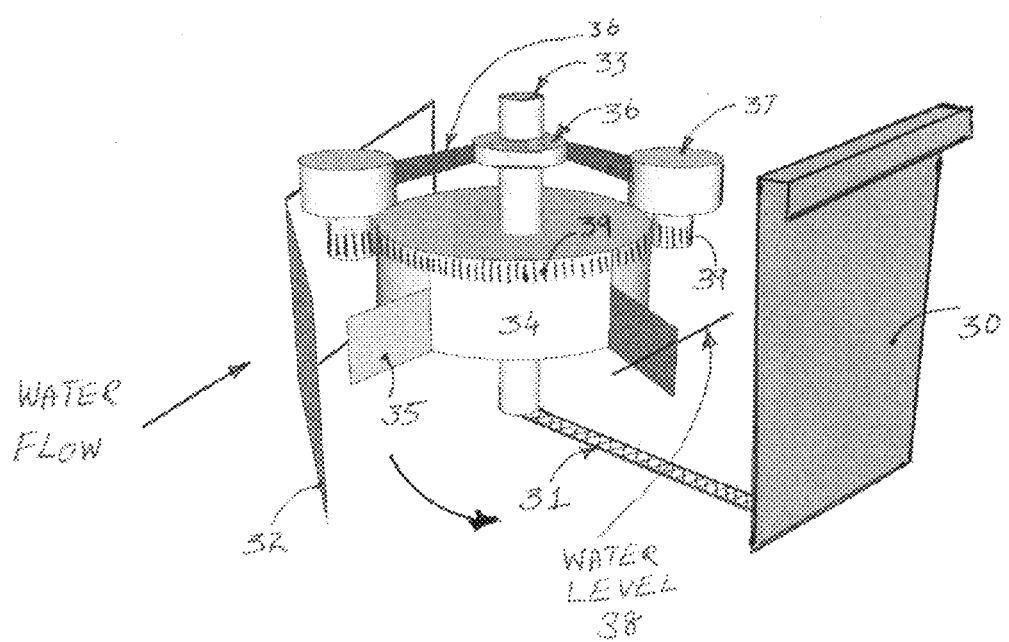

FIG. 3 is a perspective view of the invention that may be permanently or portably attached to a structure or vessel standing in moving water to convert hydrokinetic energy to electricity.

Figure 4:
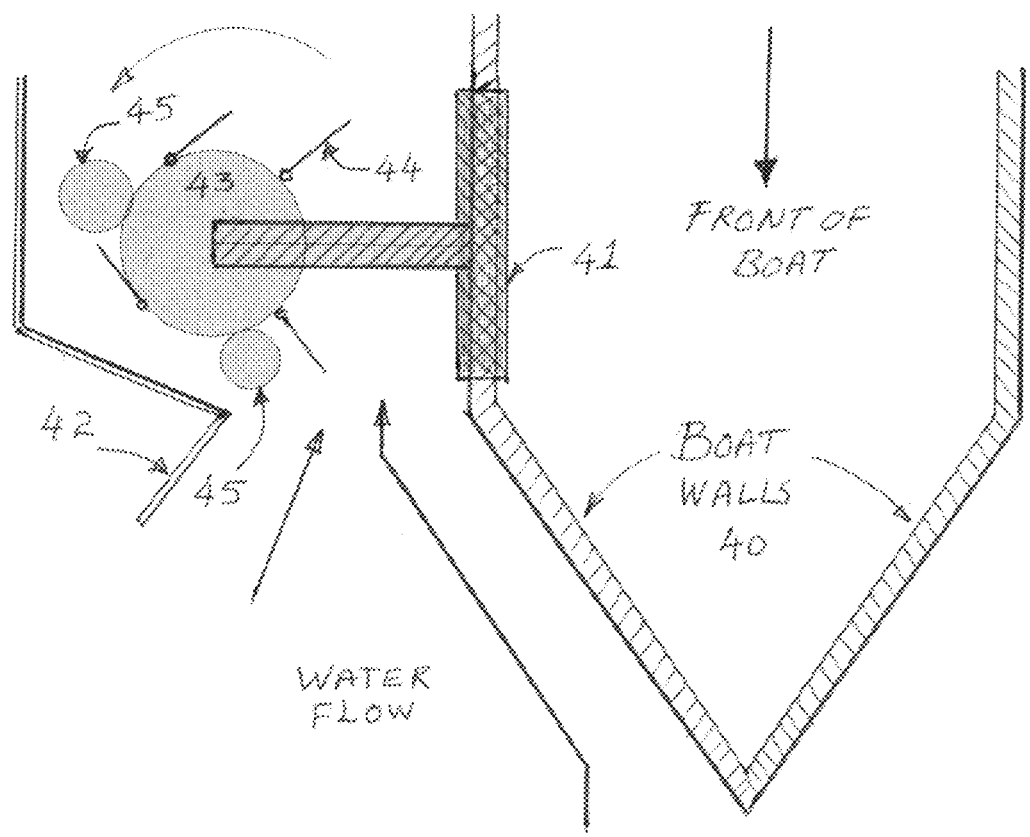

FIG. 4 is a vertical cross-sectional view (incomplete) showing a boat fitted with a portable version of the invention attached to the side of the boat to convert hydrokinetic energy in the water to electricity when the vessel is not moving; the device may be pulled into the boat when the boat needs to move.

DETAILED DESCRIPTION OF THE INVENTION

Embodiment 1

Figure 1:
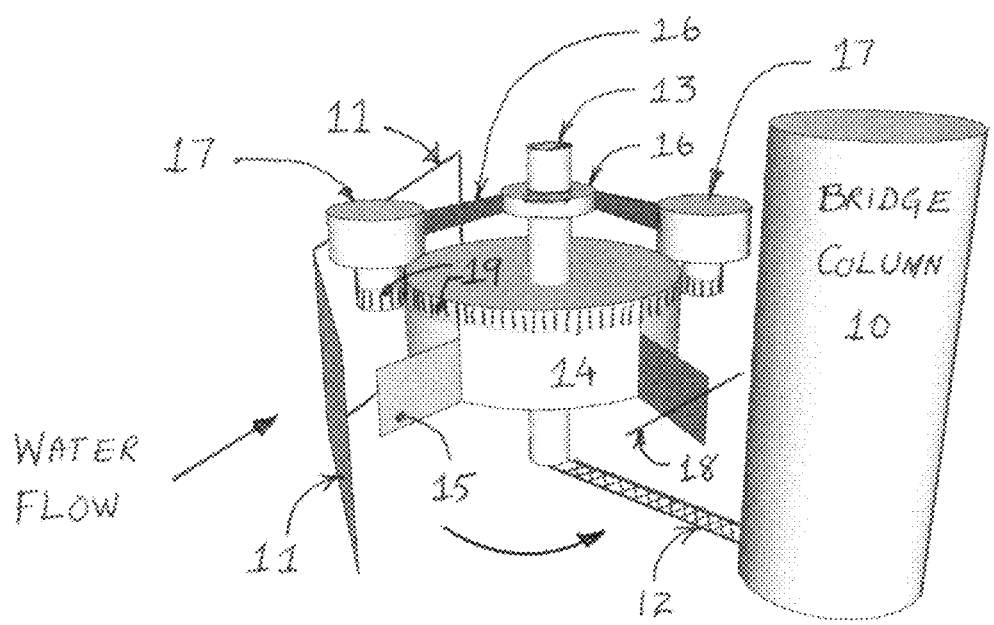
FIG. 1 is a perspective view of the invention where a bridge column supports a post that takes a vertically-sliding float that also serves as a rotary turbine with blades dipping in water.

Referring to FIG. 1, post 13 is attached securely to the bridge column 10 by a structure 12. The combined float-water turbine 14 has a plurality of hinged blades 15 which turn the water turbine counterclockwise; the blades on the water turbine fold back on the upstream side of the turn to minimize water resistance to the turning water turbine. Further, water flow deflector 11 keeps the flowing water away from the blades 15 on the upstream side of the water turbine. The waterline 18 is at or near the top edge of the turbine blade or may be slightly above the top of the turbine blade.

Gear teeth 19 on the float-turbine drive the pinion on two wind power generators 17 shown to produce electricity. The gear ratio of the gear to pinions ensures higher RPM in the wind power generators. The structure 16 with a sliding central portion and two arms DO NOT TURN, but support the two generators, and hold the pinions on the electric generators against the gears on the water turbine 14. Structure 16 is rigidly mounted on the float such that it moves up and down with the float below to ensure that the electric generators are always above the water. The electric generators may come with built-in gearboxes (not shown) to multiply the RPM of the electric generators. Electric generators could be of the conventional or, more recent, permanent magnet kind found in wind power generators.

Figure 2:
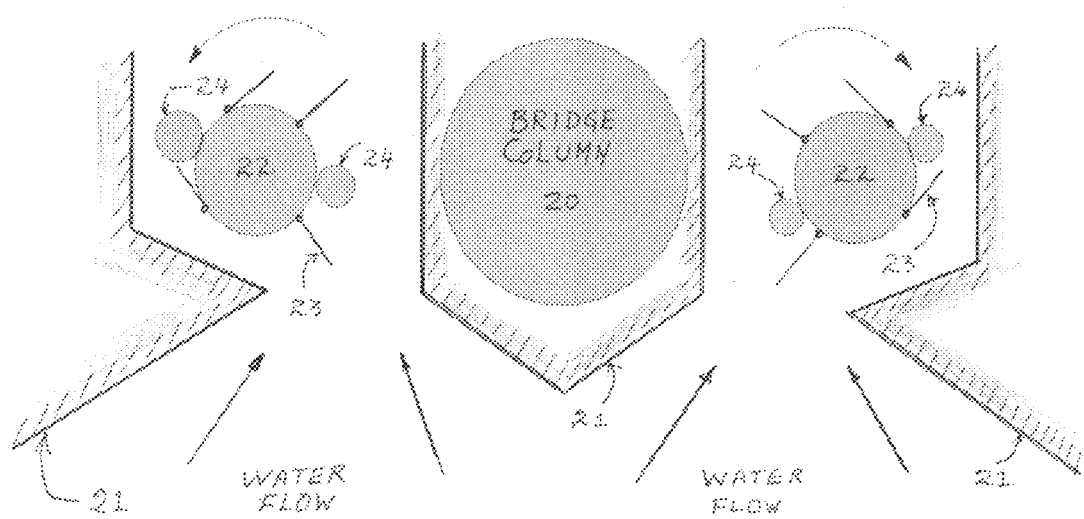
FIG. 2 is a vertical cross-sectional view (incomplete) showing one bridge column, two float-turbines, four adapted wind power generators, and water inlet areas designed to increase the speed of the water striking the water turbine blades on the downstream side.

FIG. 2 is a vertical cross-sectional view (incomplete) showing one bridge column 20 supporting two float-turbines 22, one on each side of the bridge column. The water flowing towards the bridge column is channeled by inlet structures 21 to the two float-turbines at a higher velocity than the incoming water velocity to turn water turbine 22 counterclockwise on the left of the bridge in the figure, and clockwise on the right. The water turbine blades 23 are hinged to fold back on the upstream side of the turn to minimize the resistance to the turning water turbine.

The figure shows a total of four adapted wind power generators 24, which are turned by the two water turbines. As shown in FIG. 1 above, the two float/water-turbines are free to turn as well as slide up and down a post at the center of the floats (13 in FIG. 1, not shown in FIG. 2).

Embodiment 2

Referring to FIG. 3, post 33 is attached securely to a portable turbine anchoring wall 30, which could be hung from or attached to the side of a boat, an artificial sea wall, or any structure in flowing or moving water. The supporting structure 31 connects firmly the turbine post 33 with the anchoring wall 30.

Turbine generator 34 has a plurality of hinged blades 35, which turn the turbine-generator counterclockwise; the blades on the water turbine fold back on the upstream side of the turn to minimize water resistance to the turning Turbine-generator. Further, water flow deflector 32 keeps the flowing water away from the blades 35 on the upstream side of the turbine. The water line 38 is at or near the top edge of the turbine blade or may be slightly above the top edge of the blade.

Gear teeth 39 on the Turbine-generator drive the pinions on two electric generators 37 to produce electricity. The gear ratio of the gear to pinions ensures higher RPM in the electric generators 37. The structure 36 with a sliding central portion and two arms DOES NOT TURN, but holds the pinions on the electric generators firmly against the gears on the turbine-generator 34. Structure 36 is mounted on the float such that it moves up and down with the float to ensure that the electric generators 37 are always above the water. The electric generators 37 may come with built-in gearboxes (not shown), which multiply the RPM of the electric generators. Electric generators 37 could be conventional or more recent permanent-magnet kind, commonly used in wind power generators.

FIG. 4 shows a cross-sectional view from the top an adaptation of this embodiment to a boat where the anchor 41 is portably mounted on the sidewall 40 of the boat such that the boat's bow (the front end) is turned to face in the direction from which the water currents or tides are heading to the boat. Anchor 41 supports a vertical post (not shown) that slidably takes the turbine-generator 43. The turbine-generator is capable of sliding up and down, and spinning around the post while turning a plurality of electric generators 45 through a gearing system to multiply the rpm.

Hinged turbine blades 44 are mounted radially on the circumference of the turbine-generator so that the blades fold backwards while turning upstream. The upstream side (also called, return side) of the turbine has a flow diverter 42 that not only diverts the water flow away from the blades 44 on the upstream side but also channels the water to the downstream side to increase the velocity of the water impinging on the hinged blade 44 that is stretched out radially perpendicular to the turbine-generator. This portable device could be mounted to the bow (front end) of the boat as shown in FIG. 4 such that the natural "v" shape of the bow of the boat channels and adds velocity to the water impinging on the turbine blades on the downstream side of the turbine-generator.

The invention claimed is:

1. A system for converting hydrokinetic energy in waves, water currents and in tidal flows comprising:
   a. a bridge including at least one bridge support column disposed in a body of water;
   b. a plurality of support structures attached to the bridge column extending radially from the bridge column;
   c. each radial structure emanating from the bridge supporting a vertical post at a distance from the bridge column;
   d. a floating turbine-generator rotatably and slidably mounted on each vertical post, each turbine-generator comprising:
      i. a float;
      ii. a plurality of blades circumferentially spaced around the float and extending below the surface of the water, the blades being hinged and foldable in order to minimize water resistance when rotating in an upstream direction;
      iii. a set of gear teeth circumstantially spaced around the float above the blades; and
      iv. at least one electric generator with pinion driven by the gear teeth.

2. The system for converting hydrokinetic energy in waves, water currents and tidal flows of claim 1, further comprising:
   e. flow diverters on the upstream side of the turbine-generator to guide the current and waves through a narrow channel to increase the velocity of the water on the downstream side of the turbine-generator, as well as to divert the oncoming water away from the blades on the upstream side of the turbine-generator.

3. A system for converting hydrokinetic energy in waves, water currents and tidal flows comprising:

a. a portable or fixed anchoring plate mountable onto at least one of the sides of sea walls, drilling platforms, boats, tug-boats, yachts, commercial and non-commercial boats and ships, ferries, water transports, sturdy buoys and piers;
b. a plurality of support structures attached to the anchoring plate extending into the water away from the anchoring plate;
c. each support structure emanating from the anchoring plate a vertical post at a distance from the anchoring plate;
d. a floating turbine-generator rotatably and slidably mounted on each vertical post, each turbine-generator comprising:
  i. a float;
  ii. a plurality of blades circumferentially spaced around the float and extending below the surface of the water, the blades being hinged and foldable in order to minimize water resistance when rotating in an upstream direction;
  iii. a set of gear teeth circumstantially spaced around the float above the blades; and
  iv. at least one electric generator with pinion driven by the gear teeth.

4. The system for converting hydrokinetic energy in waves, water currents and tidal flows of claim 3, further comprising:
e. flow diverters on the upstream side of the turbine-generator to guide the current and waves through a narrow channel to increase the velocity of the water on the downstream side of the turbine-generator, as well as to divert the oncoming water away from the blades on the upstream side of the turbine-generator.

\* \* \* \* \*